C. WILLEY, Jr.
DREDGING AND EXCAVATING MACHINE.
No. 8,731. Patented Feb. 10, 1852.
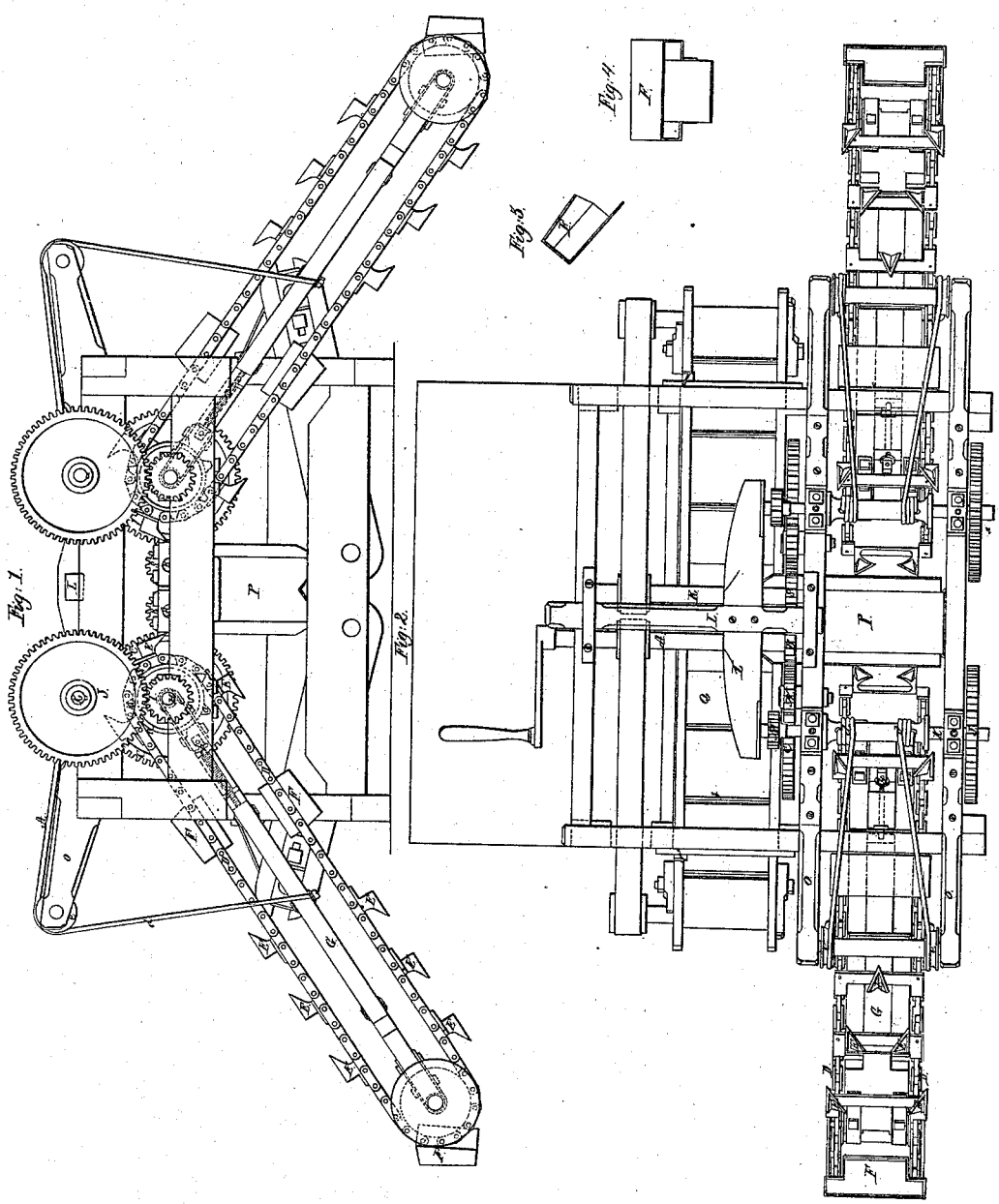

UNITED STATES PATENT OFFICE.

CALVIN WILLEY, JR., OF CHICAGO, ILLINOIS, ASSIGNOR TO HIMSELF AND URIAL WALKER.

EXCAVATING AND DREDGING MACHINE.

Specification of Letters Patent No. 8,731, dated February 10, 1852.

*To all whom it may concern:*

Be it known that I, CALVIN WILLEY, Jr., of Chicago, in the county of Cook and State of Illinois, have invented certain new and useful Improvements in Machines for Dredging and Excavating Earth and other Material; and I do hereby declare the following to be a full, clear, and exact description of the same, reference being had to the accompanying drawings, making a part thereof, in which—

Figure 1 represents an end view, and Fig. 2 represents a top view of the machine.

Similar letters in both the figures represent the same parts.

The nature of my invention consists, first, in so arranging upon the same endless chains a series of plows or cutters and buckets, as that the plows shall cut or break up the material to be excavated, and leave it in proper position to be scooped up by the buckets; second, in so arranging the frame upon which the endless chains carrying the plows and buckets are supported and carried as to allow the cutters and buckets to work outside and clear of said frame and allow it to sink to any desired depth without catching or resting upon the material to be cut away; third, hanging the frame which carries the plows and buckets so that it may be lowered by a positive motion, instead of by its own weight, to prevent the plows from being drawn too rankly into the bank when striking against or cutting through any hard substance; fourth, so arranging the several parts that the frame carrying the plows, &c., may be raised or lowered at any time without stopping or changing the direction of the buckets, thus allowing the buckets to empty themselves while the frames are being raised for the next operation.

To enable others skilled in the art to make and use my invention, I will proceed to describe the same with reference to the drawings.

The frame supporting the apparatus may be placed upon a float or carriage of any suitable kind, adapted to the purposes for which it is intended to be used. Motion may be communicated to the machine by steam, horse, or any other power through the shaft A, upon which is arranged a spur wheel B, working into a large cog wheel C, upon the shaft H, which said shaft carries one of the set of reels, with their projections $a$, for meshing into the links of and moving the endless chains D, upon which are arranged a series of plows E, the first of the series turning the material both ways, and the succeeding ones throwing the furrows inward, so as to leave it in proper position for being scooped up by the buckets F, which follow immediately behind each series of plows.

The frame G, which forms the support for the outer reels, over which the endless chains run, is made in sections, so that by means of a screw $b$, at the upper end of the frame (shown by dotted lines) it may be elongated, or shortened, for the purpose of keeping up the proper tension upon the chains; said frame is attached to the shaft B, by means of collars $c$, so that it may be free to move or swing on said shaft, down to the material being operated upon, having the said shaft as a center, and moving in the arc of a circle, and allowing it to cut from a nearly horizontal to a perpendicular line, or rather to cut underneath the bank of earth or other material being operated upon, leaving a wedge shaped piece between the frames, almost if not entirely cut off at the bottom, and which will fall by its own weight or may be easily pushed over. The reels upon which the endless chains are carried are arranged outside of the frame, and the plows and buckets upon the chains are made to project and operate sufficiently far outside of the line of the chains to cut a clear way, allowing no part of the frame to rest upon the material, or rather particular slice being cut. The frames of dredging machines heretofore in use have been always placed outside of the line of the buckets or scoops, which only allows the machine to cut down until the frame rests upon the bank. This consequently limits the distance to which the frame may sink.

On the outer end of the shaft H, which carries the upper reels, is placed a spur wheel I, which meshes into a large cog wheel J, upon a shaft K, resting in proper bearings on the top of the frame of the machine. On said shaft K, is arranged a drum, around which the rope or chain $d$, is wound, and by which the frame with the plows and buckets is raised and lowered. It will be perceived that the frame G, is lowered by a continuous, regular, and positive motion, and can sink only as the cord or chain is unwound from the drum. This prevents the plows and buckets from cutting too deep and from drawing or forcing themselves into the bank, when cutting through any hard material which would otherwise break up the machine. The motion of this drum, which feeds up, as it were, the machine to its work, may be regulated by the size of the drum, or of the cog wheel which operates it, so as to adapt the feed to the peculiar quality of the material to be excavated.

On top of the main frame of the machine is arranged a sliding crossbeam L, which when it becomes necessary to raise the frames carrying the plows and buckets is forced forward, throwing the spur wheel I, out of gear with the wheel J, and bringing a small gear wheel M, on the shaft K, into gear with an idle wheel N, which receives its motion from the cog wheel C, and reverses the motion of the shaft K, and its drum, which winds up the cords $d$, raising up the said frame sufficiently high to commence, after the machine is drawn forward to the bank of earth, &c., cutting off another slice. The cord or chain $d$, passes, after leaving the drum on the shaft K, over friction rollers $e$, placed on a shaft arranged in the ends of the arms O, and thence to a bar or support arranged at about the middle of the frame G. While the frame is being raised the buckets continue in the same direction and empty themselves into the chute P, whence the earth or other material may pass onto an endless apron Q, provided with lags $f$, by which it is carried to the sides of the machine and emptied into boats, cars, carts, or any other kind of conveyance by which it may be removed. The plows are arranged on and may be cast with the braces which connect the two chains together. The chain may be made in any of the usual well known forms, having open links at regular intervals for the projections on the reels to catch into, to keep it in place and move it, with regularity and precision, forward.

Parallel with the shaft A, is another shaft R, which has upon it a spur wheel S, which is operated by the spur wheel B, on said shaft A. The spur wheel S, meshes into and operates another series of wheels and machinery precisely in form and operation the same with that above described, making as it were a double machine, cutting toward each other. I do not, however, limit the construction of the machine to this precise form, for the frames may be arranged on the two sides of a float or carriage and work parallel with each other, or a single frame alone may be used. These forms I consider mere modifications of my invention, so long as I use the general features of the machine as herein described.

I sometimes construct my buckets with a lip as shown in Fig. 3, which represents a section through one of the buckets, for the purpose of better lifting of the material, retaining it longer in the bucket, and throwing it clear of the operating parts of the machine into the chute. The corners of the buckets are cut away, as seen in Fig. 4, so as to allow the chain to be placed nearer to the center of the bucket and to have a portion of the weight above and below the chain, which makes the mass more easily moved.

Having thus fully described the nature of my invention what I claim therein as new and desire to secure by Letters Patent is—

1. So arranging the frame upon which the endless chains carrying the plows and buckets are supported and carried, as to allow said plows and buckets to work outside of the line of said frame, and thereby to sink to any desired depth, without liability of the frame resting upon the bank to be removed, and limiting the depth to which the cutters may sink, as herein described.

2. I claim so connecting the machinery for raising and lowering the frames carrying the plows and buckets, with the driving power of the machine that, the buckets may be lowered automatically, in such proportion to the motions of the other parts of the machine, as the character of the bottom to be excavated, may demand, in manner and for the purpose substantially as described.

CALVIN WILLEY, JR.

Witnesses:
JOHN S. GREENE,
ANDREW J. BROWN.